April 26, 1949.  P. TURNER  2,468,312
PUSH TYPE OFFSET MOWER

Filed Jan. 10, 1948  3 Sheets-Sheet 1

April 26, 1949.　　　　　P. TURNER　　　　　2,468,312
PUSH TYPE OFFSET MOWER
Filed Jan. 10, 1948　　　　　　　　　　　　　3 Sheets-Sheet 2

INVENTOR,
PETER TURNER,
By Herbert A. Minturn,
ATTORNEY.

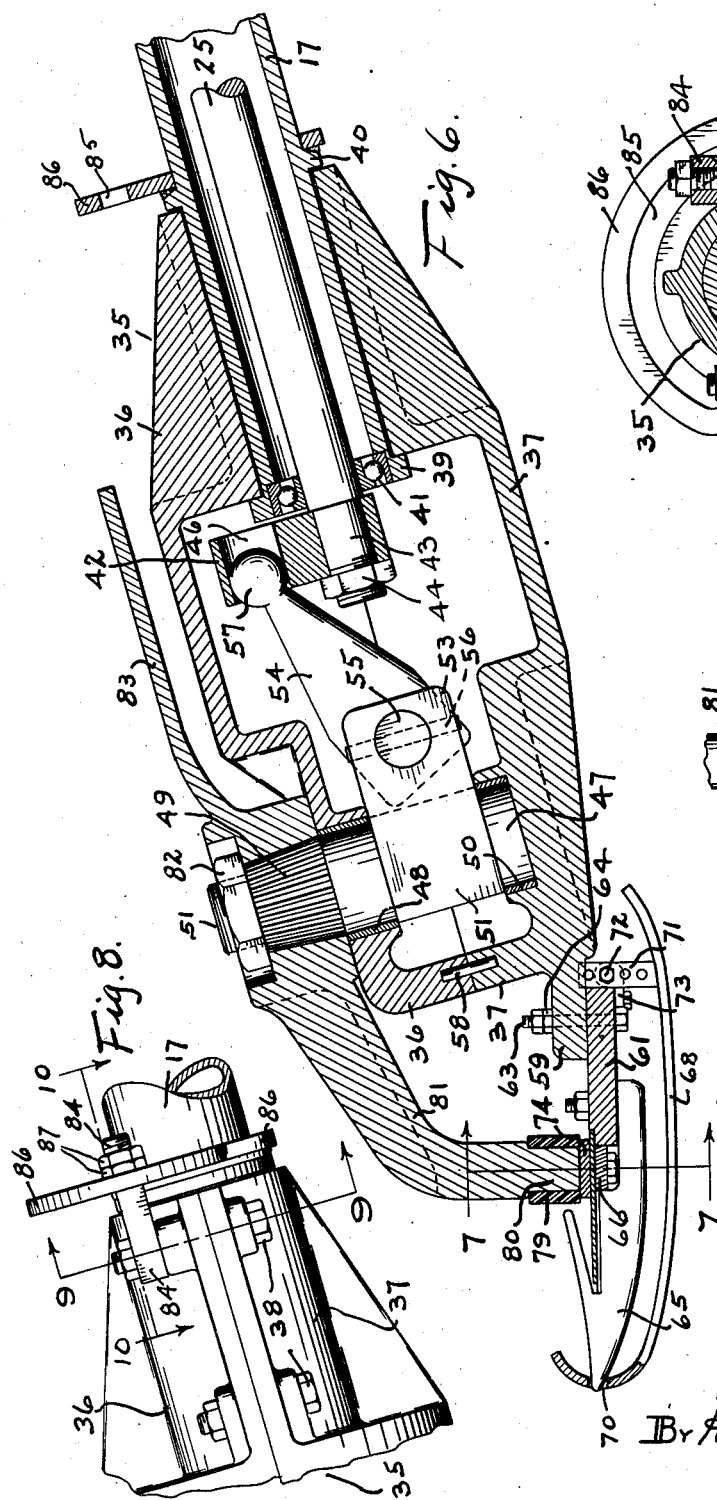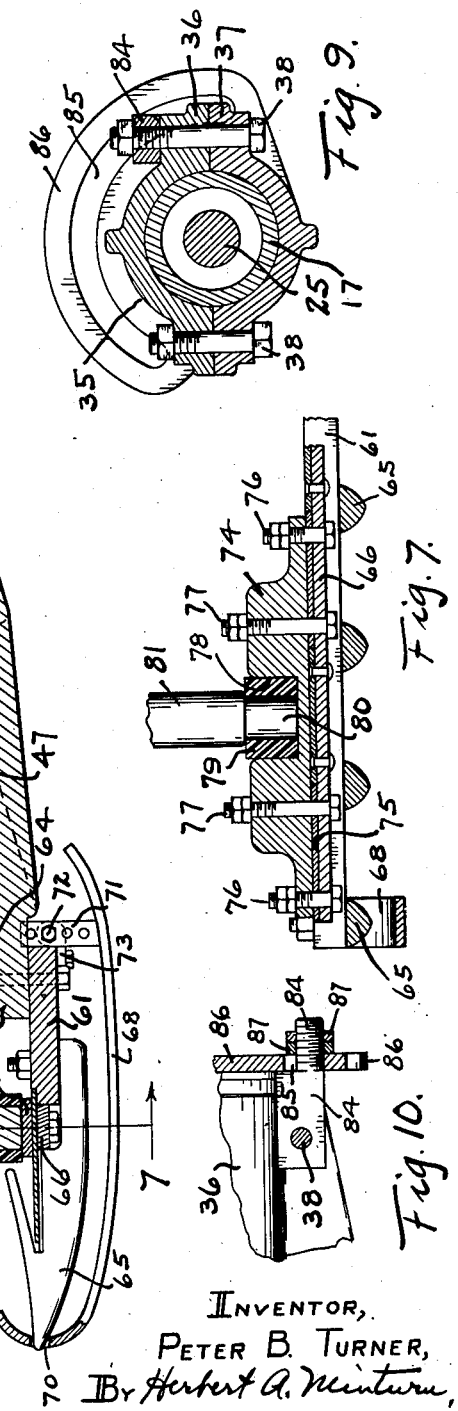

Patented Apr. 26, 1949

2,468,312

UNITED STATES PATENT OFFICE 2,468,312

PUSH-TYPE OFFSET MOWER

Peter Turner, Indianapolis, Ind.

Application January 10, 1948, Serial No. 1,554

8 Claims. (Cl. 56—25)

This invention relates to a push type mower of the reciprocating sickle type and is adapted to be applied to any type of tractor or vehicle from which the structure may be swung to extend forwardly therefrom. A primary feature of the invention is that the sickle bar is engaged at one end thereof and likewise the sickle itself is reciprocated from that end all to the purpose that the bar and sickle will extend to one side of the pushing structure and drive means so that the operator of the pushing vehicle from which the power is derived to operate the sickle may observe the sickle readily at all times as it is pushed through the uncut grass or other material which is being operated upon.

A primary object of the invention is to provide a structure of the type above indicated wherein the cutting member may be revolved about the pushing mechanism at least 180 degrees, 90 degrees downwardly from the horizontal, and 90 degrees at least upwardly from the horizontal, or even carried around the pushing means the complete circle of 360 degrees if so desired. This possibility of the invention makes the structure particularly advantageous cutting along highways and in ditches. Furthermore, it lends itself to the cutting of hedges and structures which are carried at a distance above the ground, as well as cutting grasses and the like.

A further important object of the invention is to provide an offset sickle bar arrangement which is swung about a pivot member and held in place normally by a shear pin so that when the outer end of the sickle bar or sickle may strike an obstruction, the entire assembly of the sickle and sickle bar may swing around the pivot member upon shearing the pin.

A still further important object of the invention is to swing the entire driving head and the sickle bar with its sickle at a distance sufficiently far ahead of the vehicle so that the sickle bar may ride evenly over the contour of the ground as it is pushed thereover, and further be maintained in sliding contact with the ground by means of the weight of the driving head itself. As above indicated, the cutting mechanism thus provided is always forwardly of the pushing vehicle so that the operator is not required to look to the back as he usually had to do in the past with other structures heretofore provided.

Figure 1:
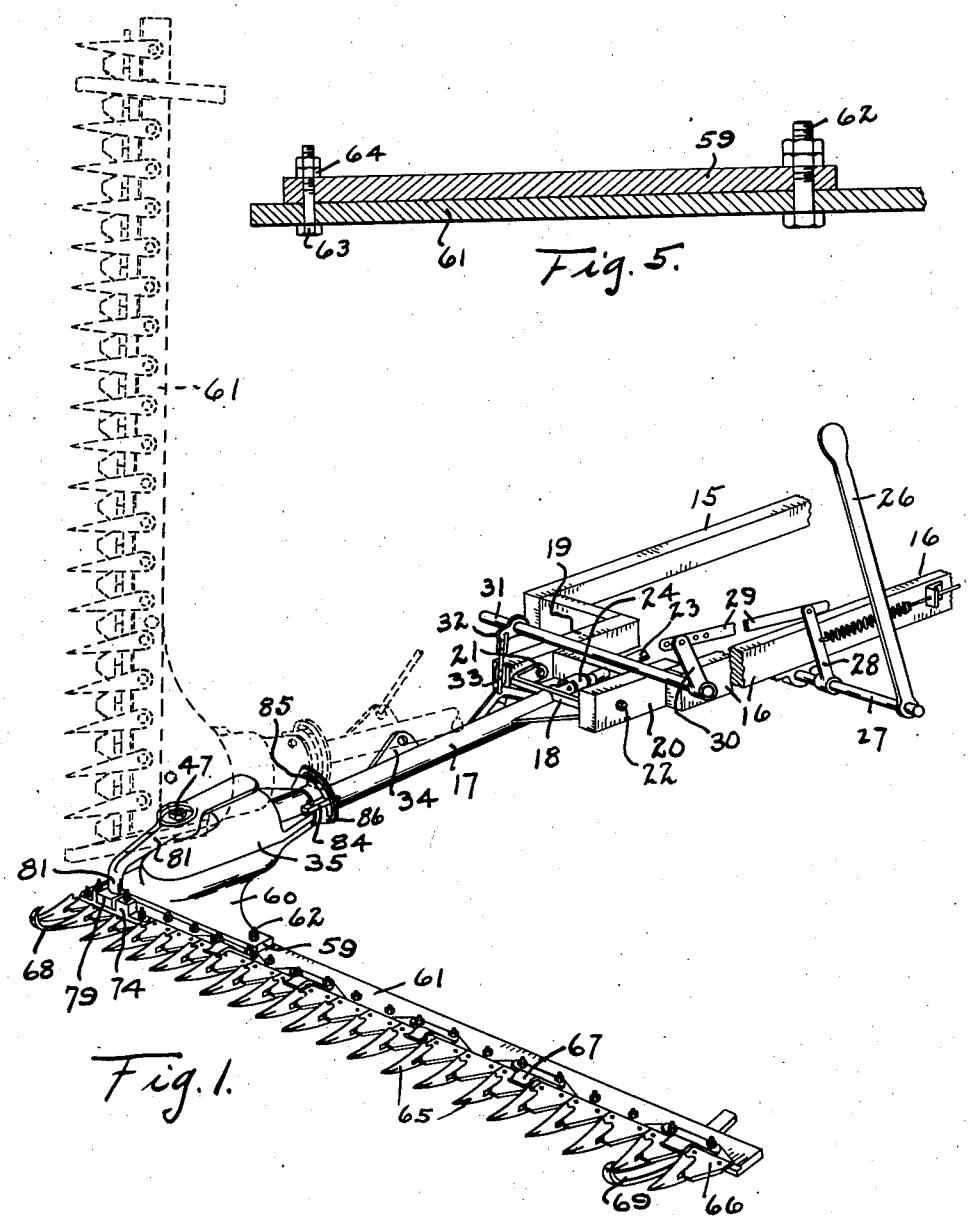
Figure 2:
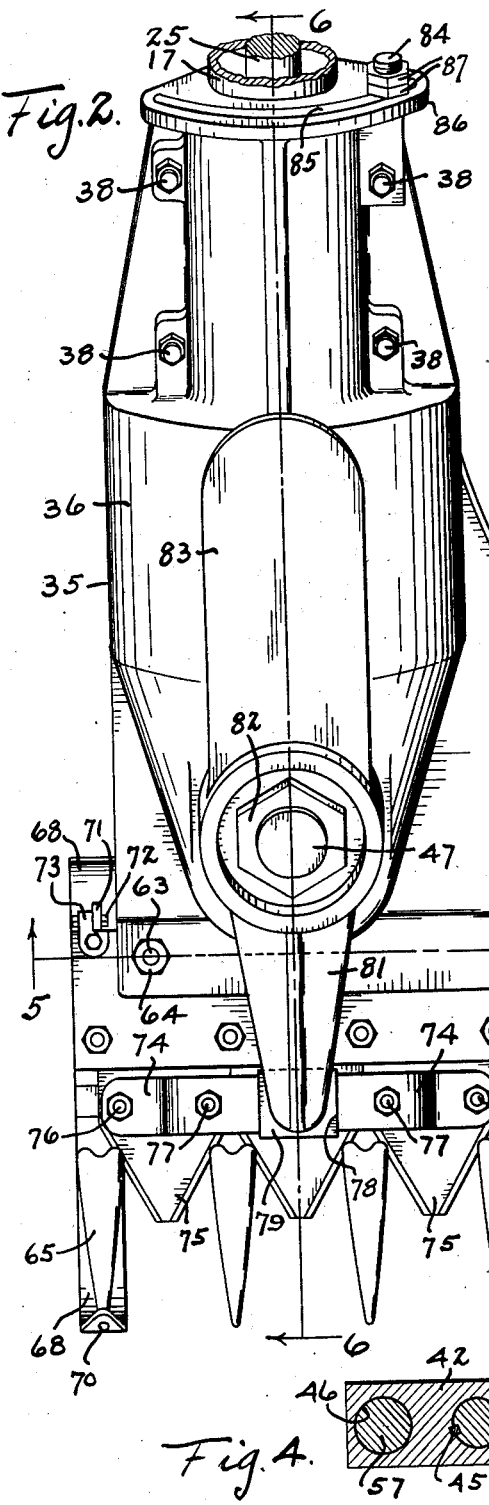
Figure 3:
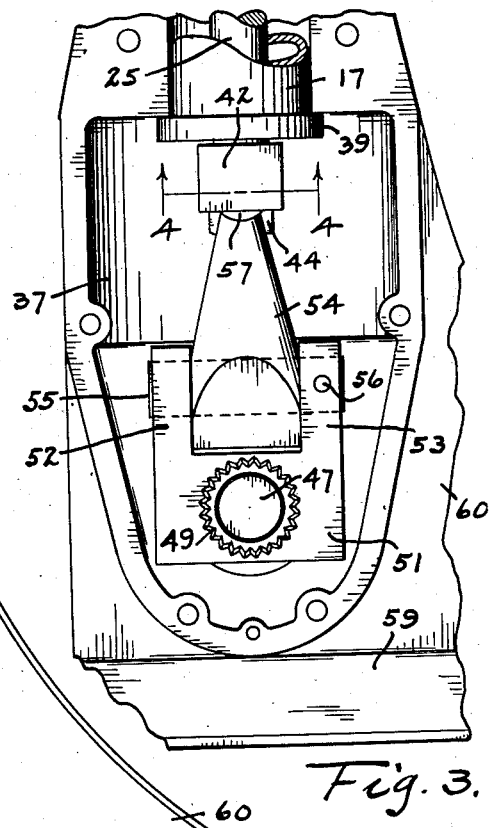
Figure 4:
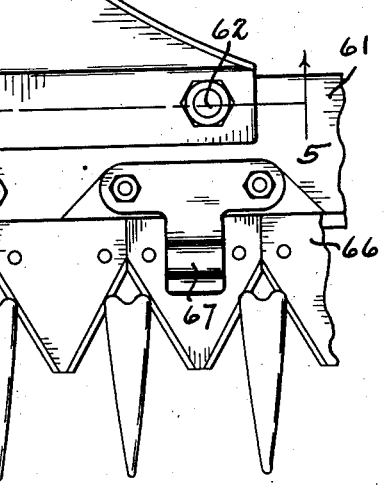

These and many other objects and advantages of the invention will become apparent to those versed in the art in the following description of on particular form of the invention as illustrated in the accompanying drawings, in which Fig. 1 is a view in front perspective of a structure embodying the invention;

Fig. 2 a view in top plan on an enlarged scale of the interconnection of the drive head with the sickle bar;

Fig. 3 a detail in top plan of the driving structure with the cover removed;

Fig. 4 a detail in transverse section on the line 4—4 in Fig. 3;

Fig. 5 a transverse section on the line 5—5 in Fig. 2;

Fig. 6 a longitudinal vertical section on the line 6—6 in Fig. 2;

Fig. 7 a detail in vertical section in the line 7—7 in Fig. 6;

Fig. 8 a detail in side elevation of the interconnection of the driving head with the pusher tube;

Fig. 9 a view in transverse section on the line 9—9 in Fig. 8; and

Fig. 10 a view in longitudinal section on the line 10—10 in Fig. 8.

Referring to the drawings, in which like characters of reference indicate like parts throughout the several views, reference is first made to Fig. 1. Upon any suitable framework, such as the members 15 and 16 which may be separate from or even a part of a vehicle (not shown), there is mounted at the forward end thereof a pusher tube 17 by any suitable means, herein shown as through a head 18 which is rockable between the forwardly extending members 19 and 20 that are secured or supported by the members 15 and 16. This head 18 is hinged to the members 19 and 20 by any suitable means, such as by the bolts 21 and 22 so that the head 18 is confined to a rocking action about a normally disposed horizontal axis. Then any suitable driving means, such as a propeller shaft 23 is brought up to the rear side of the head 18 and interconnected by means of a universal joint 24 to a drive shaft 25, Fig. 6, which extends centrally and axially through the tube 17 from its rear end to the forward end thereof.

Then a lever system may be employed to lift and lower the tube 17 as the operator may desire, the tube 17 being secured in a fixed manner to the head 18. This lever system in an elementary form consists in the present showing of a hand operated lever 26 which is secured to a cross shaft 27 that is rockable in relation to the rails or frame members 15 and 16. A lever 28 is fixed to the shaft 27 to have its outer end pivotally connected to a link 29 in turn having a forward end thereof pivoted to the outer end of a lever 30 in turn fixed to the cross shaft 31. This cross shaft 31 carries a short lever 32 from which a flexible member 33, herein shown as a chain, is swung. The free end of this chain 33 may selectively be attached to the ear 34 that is provided on the tube 17. When it is desired to swing the tube 17 upwardly, the lower end of this chain 33 may be interconnected with the ear 34. Of course, the chain 33 in a lengthened condition may be permanently attached to the ear 34. Likewise, a short condition of the chain 33 may be employed to hold the tube 17 in an upper position if desired.

A driving head generally designated by the numeral 35 is made in two parts, an upper section 36 and a lower section 37, the two sections coming together on a horizontally disposed parting line in the plane of the axis of the tube 17. These two sections 36 and 37 are secured one against the other in a closed condition by means of a plurality of bolts 38, Fig. 2, passing through ears provided on the sections. The two sections 36 and 37 when secured one against the other have defined therethrough a bore to receive slidingly therein a forward portion of the tube 17, the two sections 36 and 37 being of that length which will slidingly fit between a forward flange 39 and a rearwardly spaced flange 40 around the tube 17, Fig. 6. Thus when the two sections 36 and 37 are bolted one against the other to have the forward end of the tube 17 passed therein, the head 35 is secured against longitudinal displacement along the tube 17, but is allowed to be free to revolve therearound, their two geometric axes being coincident or in common.

In the forward end of the tube 17 is positioned a bearing 41, herein shown as of the ball bearing type. This bearing 41 serves to support the shaft 25 at its forward end. A crank arm 42 is fitted over the forward end of the shaft 25, over a reduced diameter portion thereof, designated by the numeral 43, and is secured in place by means of a nut 44. The arm 42 is keyed to the shaft 25 by means of a suitable key 45.

The outer free portion of the crank 42 is provided with a bore 46 therethrough, the axis of which is parallel to the axis of the shaft 25. In the forward end of the housing 35, there is revolubly positioned a post 47, the lower end of which fits within a bearing provided in the lower section 37 and extends through a bearing 48 carried by the upper section 36, to have a tapered and serrated portion 49 extending beyond the top side of the section 36. The bearing in the lower section 37 is designated by the numeral 50.

Fixed to this post 47 is a block 51 which is bifurcated to form two arms 52 and 53 between which a connecting rod 54 is swung by being pivoted on a transverse pin 55 carried by these two arms 52 and 53. In the form herein shown, this pin 55 is secured against rotation by means of a pin 56 extending through the arm 53 and the pin 55. This connecting rod 54 has a rocking fit between the two arms 52 and 53 and tapers therefrom to have a ball 57 carried integrally on its outer free end to fit within the bore 46 of the crank arm 42. The diameter of this ball 57 is made to be such that it has a close sliding fit with the walls of the bore 46. A dowel pin 58, Fig. 6, extends between the upper and lower sections 36 and 37 of the housing to maintain those sections in alignment at their forward ends.

The lower housing section 37 has formed integrally therewith a transverse flange 59 which extends primarily across the section 37 at its lower forward portion and primarily to one side thereof, Fig. 2. This flange 59 is supported to the right, Fig. 2, by a gusset 60 so as to maintain the flange 59 in rigid alignment with the head 35, the flange 59 extending at right angles to the axis of the shaft 55. As will be noted in Fig. 2, the left hand end of this flange 59 does not extend beyond the side of the housing 35.

A sickle bar 61 is brought up against the under side of this flange 59 and secured thereto by means of a pivot bolt 62. To maintain the sickle bar 61 in normal parallel relation with the flange 59, a shear pin 63 is inserted through the sickle bar 61 and through the flange 59, this pin 63 in the present showing consisting of a bolt having a nut 64 screw-threadedly engaging the top end as it projects from the flange 59. The pivot bolt 62 has a much larger diameter than that of the pin 63 so that should the outer free end of the sickle bar 61 meet with an obstruction, the leverage system is such and the diameter of this bolt 63 is such that it will shear and allow the outer free end of the bar 61 to rock relatively rearwardly around the pin or bolt 62.

The sickle bar 61 is of the usual construction and has attached thereto the usual guards 65 at regular intervals therealong. Then there is the usual sickle 66 mounted on the top and forward side of the bar 61 to be held in position normally by the presser fingers 67, all in the usual manner for a reciprocating mower of this type. A pair of shoes 68 and 69 are mounted to extend around under the bar 61 in the usual manner. For example, Fig. 6, the shoe 68 is curved around forward of a guard 65 to have a hole 70 receive the front point of the nose of the guard 65 therethrough and extend around under the guard and under the bar 61 to have an upright bracket 71 extend upwardly and be selectively engaged by a bolt 72 carried by a bracket 73. By this means, the shoe 68, as well as the shoe 69 may be adjusted relative to the bar 61 to space the bar at the desired distance above the ground.

At the extreme right hand end of the sickle 66 is fixed thereto a driving bracket 74, herein shown as mounted immediately above the respective sections 75 of the sickle. In the present showing, this bracket 74 is fixed to the sickle by means of a pair of short bolts, 76, and a pair of longer bolts 77. In the central zone of this bracket 74 there is provided a fore and aft slot thereacross designated by the numeral 78, within which slot there is fitted a block of plastic or some resilient material designated by the numeral 79. This block 79 has a central bore therethrough to receive the lower cylindrical end 80 of the lever arm 81 which in turn is fitted down over the serrated portion 49 of the post 47, Fig. 6, and there secured by means of the nut 82. This arm 81 has a rearwardly extending finger 83 which extends over the top section 36 of the housing 35 a short distance to serve as a means for knocking grass or other cut material from over the top side of the housing.

Normally, the housing 35 is left free to revolve around the forward end of the tube 17, but it may be fixed in any desired point of that revolution by means of a bolt 84 fixed to the housing 35 in some manner. This bolt 84 in the present showing is herein shown as being fixed to one of the bolts 38, Fig. 8, to extend rearwardly from the housing 35 and through a slot 85 of a sector 86 which in turn is fixed to the tube 17 behind the flange 40, Fig. 6. By means of nuts 87, the interengagement of the bolt 84 and the sector 86 can be fixed at any point of travel of the bolt 84 around the slot 85, simply by drawing the nuts 87 up against the rear face of the sector 86.

From the foregoing description of the particular form of structure shown in the drawings, it is to be observed that the drive shaft 25 has its rotary motion transformed into reciprocating motion at the end of the lever 81, this end being caused to travel primarily longitudinally of the sickle bar 61 to set up the reciprocating action of the sickle 66. In other words, all of the mechanism which is required to set up that reciprocating action as provided from the shaft 25 is enclosed within the housing 35 with the exception of the externally presented lever arm 81.

Further, it is to be seen that the sickle bar 61 is secured to the enclosed head 35 at the extreme right hand end of the bar 61 in the present showing. Obviously, the bar 61 could be engaged at its left hand end if so desired. However, the essential feature is that this bar 61 be secured to the head 35 at the extreme end of the bar 61 in either case so that the outer right hand end of the bar 61 is in substantial alignment with the right hand side of the head 35. That is to say, there is neither any overhanging of the head 35 to the right end of the bar 61, and neither is there any appreciable extension of the bar 61 beyond that side of the head 35.

By means of this particular mounting of the bar 61 on the head 35, the tube 17 may be used as a device to align the travel of the bar 61 ahead of the vehicle so that the axis of the tube 17 is substantially on that line of demarcation or junction between the standing grass or grain and the previously cut swath. Then again by mounting the head 35 at the extreme end of the bar 61, the bar 61 may be revolved about the axis of the tube 17 whereby the cut may be had from the horizontal, or even below the horizontal depending upon the contour of the ground, or the slope of the ground, and even permitting the shifting of the bar 61 around to the vertical or even a position beyond the vertical, all as may be desired to meet the peculiar situation under which the mower is to operate.

While I have shown the invention in the one particular form, it is obvious that structural changes may be employed without departing from the spirit of the invention, and I therefore, do not desire to be limited to that precise form beyond the limitations which may be imposed by the following claims.

This application is a continuation in part of application 747,692 filed May 13, 1947.

I claim:

1. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means, said driving means being adapted for connection with a source of power, said one part of said support means being connected to said sickle bar adjacent one end of said sickle bar.

2. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means in substantial alignment with the axis of said pivotal connection, said driving means being adapted for connection with a source of power, said one part of said support means being connected to said sickle bar adjacent one end of said sickle bar.

3. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means in substantial alignment with the axis of said pivotal connection, said driving means being adapted for connection with a source of power and including a crank mechanism connected to said sickle, a thrust link and a thrust block, said one part of said support means being connected to said sickle bar adjacent one end of said sickle bar.

4. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means in substantial alignment with the axis of said pivotal connection, said driving means being adapted for connection with a source of power, said relatively rotatable parts including a part rigidly connected to the sickle bar and a second part mounted in sleeved relationship with said first-named part, said one part of said support means being connected to said sickle bar adjacent one end of said sickle bar.

5. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means in substantial alignment with the axis of said pivotal connection, said driving means being adapted for connection with a source of power, said relatively rotatable parts including a part rigidly connected to the sickle bar and a second part mounted in sleeved relationship with said first-named part, and means for adjustably regulating the rotatable position of one part with regard to the second part, said one part of said support means being connected to said sickle bar adjacent one end of said sickle bar.

6. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means in substantial alignment with the axis of said pivotal connection, and means for drivingly connecting said driving means with a source of power from said motor vehicle and at a point beneath said motor vehicle, said one part of said support means being connected to said sickle bar adjacent one end of said sickle bar.

7. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means, said driving means being adapted for connection with a source of power, said one part of said support means being connected to said sickle bar adjacent one end of said sickle bar, and release means permitting relative movement between said one part and said sickle bar upon operation of said release means.

8. A push-type mower comprising support means, said support means having a pivotal connection adapted for mounting on a motor vehicle, a sickle and a sickle bar, said support means including at least two parts relatively rotatable with relation to each other about a common axis, one of said parts being operatively connected to said sickle bar, driving means operatively connected with said sickle and supported at least partially by said support means, a universal connection in said driving means in substantial alignment with the axis of said pivotal connection, said driving means being adapted for connection with a source of power, said relatively rotatable parts including a part rigidly connected to the sickle bar and a second part mounted in abutting relationship with said first-named part, said one part of said support means being connected to said sickle bar adjacent one end of said sickle bar, said second part being connected to said pivotal connection.

PETER TURNER.

REFERENCES CITED

The following references are of record in the file of this patent:

UNITED STATES PATENTS

| Number | Name | Date |
| --- | --- | --- |
| 231,282 | Cunningham et al. | Aug. 17, 1880 |
| 1,857,342 | Albrecht | May 10, 1932 |
| 2,120,671 | Jensen et al. | June 14, 1938 |
| 2,236,598 | Hautzenroeder | Apr. 1, 1941 |
| 2,245,447 | Simpson | June 10, 1941 |
| 2,304,421 | Rogers | Dec. 8, 1942 |
| 2,328,838 | Oberlink | Sept. 7, 1943 |